United States Patent [19]

Müller et al.

[11] Patent Number: 5,554,830
[45] Date of Patent: Sep. 10, 1996

[54] NOISE-REDUCING COVERING FOR VEHICLE INTERIOR

[75] Inventors: Peter Müller, Rheinheim, Germany; Günther Wedermann, Wallisellen, Switzerland

[73] Assignee: Matec Holding AG, Küsnacht, Switzerland

[21] Appl. No.: 269,961

[22] Filed: Jun. 30, 1994

Related U.S. Application Data

[63] Continuation of Ser. No. 842,199, filed as PCT/CH91/00137, Jun. 24, 1991 published as WO92/01587, Feb. 6, 1992, abandoned.

[30] Foreign Application Priority Data

Jul. 19, 1990 [CH] Switzerland .............................. 2402/90

[51] Int. Cl.⁶ .................................................... E04B 1/82
[52] U.S. Cl. ............................................ 181/290; 181/294
[58] Field of Search ..................................... 181/284, 286, 181/290, 291, 292, 294, 296

[56] References Cited

U.S. PATENT DOCUMENTS

| 3,952,126 | 4/1976 | Dycks ........................... 428/235 |
| 4,515,239 | 5/1985 | Blatt et al. ..................... 181/290 |
| 4,574,915 | 3/1986 | Gahlaü et al. .................. 181/290 |
| 4,735,284 | 4/1988 | Gahlau et al. .................. 181/290 |
| 4,825,974 | 5/1989 | Huffman et al. ................ 181/290 |
| 4,940,112 | 7/1990 | O'Neill ........................... 181/290 |
| 4,966,799 | 10/1990 | Lucca et al. ................. 181/290 X |
| 5,088,576 | 2/1992 | Potthuff et al. ............... 181/290 |

FOREIGN PATENT DOCUMENTS

| 104357 | 4/1984 | European Pat. Off. . |
| 253376 | 1/1988 | European Pat. Off. . |
| 2006741 | 2/1970 | Germany . |
| 8121378 | 2/1982 | Germany . |
| 3709080 | 12/1988 | Germany . |
| 8812664 | 1/1989 | Germany . |

OTHER PUBLICATIONS

International Search Report dated Sep. 11, 1991.

*Primary Examiner*—Khanh Dang
*Attorney, Agent, or Firm*—Wigman, Cohen, Leitner & Myers, P.C.

[57] ABSTRACT

The method according to the invention for the manufacture of a noise-transmission-reducing covering (1) with essentially an insulation composite (3) and a carpet covering (5) proposes to configure both the carpet covering (5) and the insulation composite (3) so that a sound field (17) can couple with a spongy mass layer (11) and be absorbed into this layer. A preferred embodiment has at least one suitable insulating barrier coating (19), in order at least to protect the spongy mass layer (11) from contamination.

2 Claims, 1 Drawing Sheet

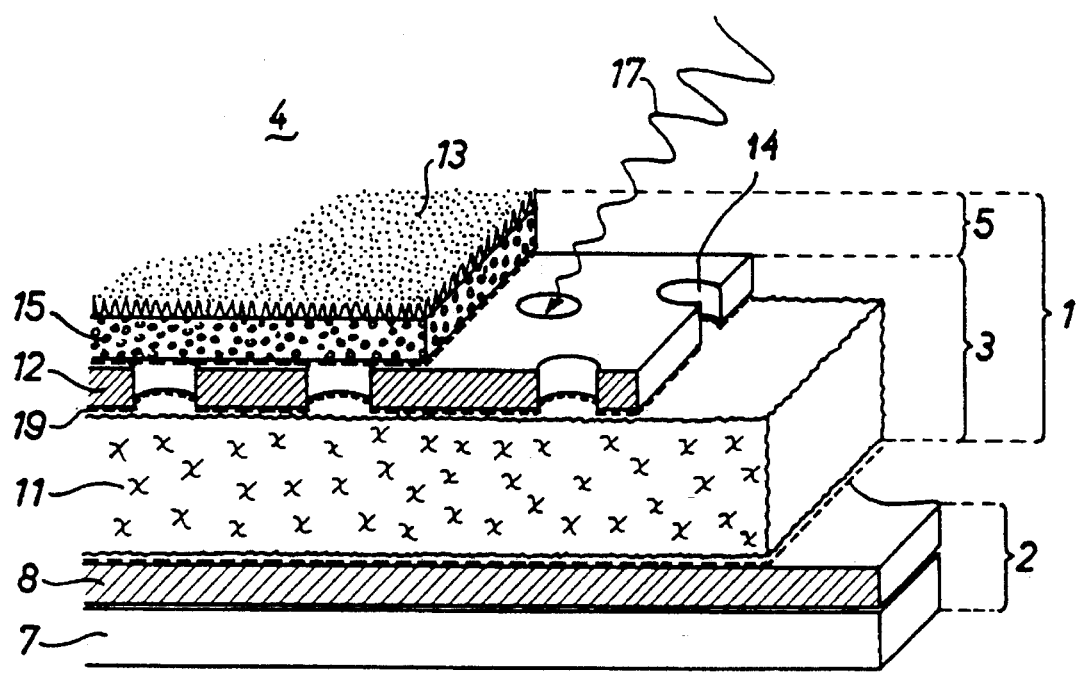

NOISE-REDUCING COVERING FOR VEHICLE INTERIOR

This is a continuation of application Ser. No. 07/842,199, filed as PCT/CH91/00137, Jun. 24, 1991, published as WO92/01587, Feb. 6, 1992, abandoned.

BACKGROUND OF THE INVENTION

1. Field of the Invention

The present invention pertains to a method for the production of a noise-reducing covering for the inside fittings of passenger compartments of vehicles with carpet covering on the passenger side, which incorporates a carpet surface layer and a carpet subsurface layer especially consisting of foamed plastic, with an acoustic insulation composite made up of at least one dense layer turned toward the carpet covering working as the solid mass of an acoustic spongy mass composite and a spongy mass layer turned toward a vibrating bottom part of the automobile body, working as spongy mass layer having sound-damping quality and being the other part of the acoustic spongy mass composite, and also a noise-reducing covering manufactured according to this method.

Such methods and coverings are used mainly in the field of automobile construction, where coverings that are not only decorative but also functional are used for the inside fittings of vehicles. Especially recently, coverings are being used with which the noise transmission level can be appreciably reduced in the passenger compartment in order to increase the degree of comfort. On that account, the modern automobile industry shows great interest in features leading to the effective reduction of among other things the noise level generated by motor, exhaust or tire noises inside vehicle passenger compartments.

2. Description of the Prior Art

Conventional measures for reducing the noise level are generally carried out in two steps. In the first step the noise-transmitting and noise-generating auto body parts are coated with bituminous coatings and are stiffened. In the second step a sound insulation composite is applied as an acoustic spongy mass composite, onto which, is then applied a decorative carpet. Such multiple-layer composite coverings on the one hand dampen the street noises by the mass effect as well as by the reinforcement produced by the dense bituminous layer coated thereon, for instance in the wheel wells, and also dampen the body sound produced by vibration of the auto body parts. The carpet coverings which are either glued on or simply placed thereon generally have another sound-absorbing backing foam layer, in order to further reduce the noise level in the vehicle passenger compartment. Such multiple-layer composite coverings are characterized by their relatively effective general sound-damping and body sound-damping properties and can be adapted relatively simply by any desired selection of carpet coverings to obtain the desired decorative effect. However these multiple-layer composite coverings are often undesirably thick, have a voluminous and complicated method of manufacture and are extremely problematical in handling.

An adhesive insulation composite is described in European Patent A-253,376, in which a first coating is applied to the bottom layer and said first coating supports a multiple-layer insulation working as acoustic spongy mass composite. An uncoupler layer consisting of non-rigid elastic, predominantly open-pore material, is applied to this insulation layer or its dense integral sublayer, and a carpet covering consisting once again of surface layer and subsurface layer is fastened to the uncoupler layer. This insulation composite indeed is acoustically effective, but for various reasons is not very satisfactory.

On the one hand the construction suggested by European Patent A-253,376 yields a composite covering which must be produced in a special step during automobile manufacture, where the work must be done in as little space as possible, and this construction is of unacceptably great height. On the other hand the uncoupler layer disclosed in the European Patent A-253,376 reduces the non-slip quality of the entire covering and thus produces a sense of instability and insecurity for the passenger. One further considerable drawback of the noise-transmission-reducing covering disclosed in European Patent A-253,376 lies in the moisture- and dampness- suction capability inherent in any open-pore material, whereupon these coverings become quickly contaminated and rapidly lose their desirable properties. Such contaminated coverings are subject to undesirable decomposition processes to troublesome evaporation which significantly reduces its useful service life. In sum, the method for production of such an adhesive insulation composite and the resulting article are costly and impractical.

European Patent A-104,357 describes a multiple-layer sound-damping covering which is adhesively attached to the bottom plate of a vehicle and consists essentially of a first resilient absorption layer, a dense porous layer, a second comparatively rigid absorption layer and a decorative cover layer. The objective of this sound-damping covering is to improve the damping of noise transmission reflected from the auto body parts into the inside of the vehicle, especially noise below 1 kHz. The layer construction described in European Patent A-104,357 requires a costly method of manufacture and is therefore not very commercially attractive. These sound-damping coverings are usually manufactured of foam material. Therefore the latter must have a closed cover layer in order to prevent the flow of the foam backing through the pores of the carpet layer to the visible side of the decorative cover layer. These sound-damping coverings are not suitable for absorption of the sound field found inside the vehicle passenger compartment.

OBJECTS AND SUMMARY OF THE INVENTION

Accordingly, it is a primary purpose of the present invention to provide a simplified method for producing a noise-reducing covering which does not have the drawbacks of the prior art methods and articles for noise reduction inside vehicles.

Another object of the present invention is to provide a method which simplifies the manufacture of acoustically effective coverings and results in the production of coverings wherein the acoustic effectiveness as well as the service life is increased while the structural strength remains the same.

These and other objects are attained according to the invention by providing a method which is characterized in that both the entire carpet covering and also the dense layer of the insulation composite are configured as air-permeable layers in order to heighten the sound-absorbing effectiveness of the covering, and the sound-reducing coverings manufactured according to this method.

Thus, sound field on the passenger side couples with the spongy mass layer of the insulation composite inside the vehicle passenger compartment, and the acoustic properties of the spongy mass layer which come into play can be used for absorption of this sound field. In this manner, the acoustic effectiveness of the entire composite covering is increased without requiring the addition of more absorbing layers and without increasing the thicknesses of the parts of the total covering element.

The arrangement according to the present invention further provides that the free space for optimization of the slip-resistance is increased and the covering elements manufactured according to the invention can be adapted without causing a problem to the various members of the undercarriage parts working as sound sources or sound diminishers.

The method of the present invention has proven to be surprisingly simple and effective, and yields a low-cost and permanent solution to reducing the noise level inside vehicles.

In one preferred embodiment the spongy mass layer of the acoustic insulation composite is provided with an insulating barrier layer which protects the composite from contaminants which negatively influence the acoustic effectiveness and dependability of these layers. According to the present invention a barrier layer which is water-impermeable and capable of diffusing water vapor is provided.

Another purpose of this insulating barrier layer is to hold back the troublesome noise generated even by the spongy mass layer from the inside of the vehicle.

Other preferred features of the method according to the invention and of the noise-decreasing covering are explained in greater detail hereinafter relative to some exemplary embodiments and with reference to the attached drawing.

BRIEF DESCRIPTION OF THE DRAWING

The single drawing is a perspective representation of a section of a covering produced according to the present invention and resting on a vibrating bottom part of an automobile body.

DETAILED DESCRIPTION OF THE PREFERRED EMBODIMENTS

As depicted in the drawing, the covering 1 lies on a vibrating bottom part of the automobile body 2 and comprises an acoustic insulation composite 3 which overlies the bottom part of the automobile body 2. A carpet covering 5 overlies composite 3 and has its outer surface 13 facing the passenger compartment 4. Automobile body bottom part 2 is generally formed of a sheet metal or plastic member 7, and is covered with a bituminous layer 8 by conventional melt-deposit or adhesive attachment techniques. Under some circumstances bituminous layer 8 can be simply placed thereon. Such bituminous layers are used on account of their remarkable vibration-damping effect and are sufficiently known to any person in the vehicle acoustics art.

The insulation composite 3 of the present invention which is applied to bottom part 2 of the auto body comprises a spongy mass layer 11 working as a spongy mass having the sound-damping quality of the acoustic spongy mass composite 3 and a dense layer 12 serving as solid mass. The spongy mass layer 11 is generally known in the art. In one preferred embodiment, spongy mass layer 11 is a suitable fleece fiber. Also contemplated is a foam material which can also be used as a spongy mass having sound-damping quality. Generally, a bituminous layer or a rubber-like recycled product can be used as the dense layer 12. Preferably, dense layer 12 has a surface weight of 2–4 kg/square meter, but can weigh considerably more than 15 kg/square meter.

The dense layer 12 according to the invention is air-permeable. As shown in the drawing, layer 12 is provided with openings 14 to yield a suitable porosity. These openings 14 can be formed by particularly dimensioned and distributed bores, or, can already exist in a natural manner, especially with open-pore foams.

It is to be understood that materials which facilitate a controllable porosity, as is the case especially with mats filled or partially filled with dense particles, are preferred. With controllable air-permeability and the desired distribution of the porosity, this method permits, for the first time, (1) the possibility of controlling the degree of air flow resistance required for the acoustic effectiveness of the entire covering, and (2) of establishing all of the critical elements and adapting them to site requirements and conditions. In one preferred embodiment the air flow resistance of the entire covering has a constant value independent of the compressed zones of the spongy mass layer at local sites. The desirable distribution of porosity was produced by the addition of apertures or openings 14 approximately 9 mm diameter.

The carpet covering 5 applied to porous insulation composite 3 is preferably made of a velour-like surface layer 13 and a subsurface layer 15. It is to be understood that the surface layer 13 can also be of a needle felt or some other material and that carpet covering 5 can be any desired carpet to correspond thereto. It is important for covering 1 that the carpet covering 5 be open-pore, so that the sound field 17 of passenger compartment 4 is coupled with spongy mass layer 11 thereby absorbing the sound field.

The use of spongy mass 11 having a sound-damping quality and acting also as an absorber leads to a surprisingly high acoustic effectiveness, even though the solid mass of the spongy mass composite 3 is randomly distributed in small bits. Such effectiveness was measured on a test sample of the covering material made in accordance with the invention and built into a vehicle by a movable test rig in semi-sound-proof chamber. In such a test the motor was accelerated in about 1 minute from approximately 1500 to approximately 6000 revolutions per minute and the acoustic pressure measured at the location of the outer ear of the assistant driver with a calibrated measuring system. An improvement of the inside noise transmission reduction could thus be established for all speeds. This improvement is several percentage points of the articulation index as compared with a conventional covering. With this construction the spongy mass layer 11 has a thickness of about 15 mm, and dense perforated layer 12 has a thickness of approximately 2 mm.

With the tested manufacture of a covering according to this method the spongy mass layer 11 is attached by adhesive at certain points to dense layer 12 of the acoustic spongy mass composite. Carpet covering 5 is likewise fastened to the insulation composite 3.

In order to obtain the excellent long term acoustic properties of the spongy mass layer 11 and to protect the vehicle inside compartment from noise encroachment, the covering according to the invention is preferably provided with an insulating barrier layer 19 lying between spongy mass layer 11 and dense layer 12 of insulating composite 3. Insulating barrier layer 19 is water-impermeable and in the simplest case consists of a permanent elastic, porous, adhesive layer. It is to be understood that any suitable hydrophobic coating material can be used as barrier layer 19. Alternatively a corresponding treatment can be undertaken which can be selected according to the nature of the particular spongy mass layer 11 so that the desired properties can be selected correspondingly. For example, a microporous film conditioned to transmit the sound waves from the passenger side can also be inserted as barrier layer 19.

In accordance with the teaching of the present invention insulating barrier layer 19 is both air-permeable and water vapor-permeable.

Other configurations of the covering according to the invention fall within the traditional technical expertise of the person skilled in the art. Thus for instance insulating barrier layer 19 can be impregnated or can be a sprayed-on coating, especially flame-sprayed. Likewise it is to be understood that the insulating barrier layer 19 can also be placed between dense layer 12 of insulating composite 3 and carpet covering 5, or, can be integrated into carpet covering 5. The use of a suitably perforated foil also lies within the expertise of a person skilled in the art.

In another preferred configuration of the covering according to the invention the porous dense layer 12 of acoustic insulation composite 3 is integrated into carpet covering 5. This simplifies the method according to the invention for the production of the noise-transmission-reducing covering.

By the same terms the slip-resistance can also be improved. In other words the feeling of insecurity on account of a soft surface can be overcome. It is to be understood that the expert in the art can establish the proper dimensions of the individual layers for the most desirable effect with special reference to the effects described in this specification.

It is further to be understood that the aforementioned method an the covering produced for vehicles of any type according to this method can likewise be used in all structures in which the noise level is to be reduced.

Although only preferred embodiments are specifically illustrated and described herein, it will be appreciated that many modifications and variations of the present invention are possible in light of the above teachings and within the purview of the appended claims without departing from the spirit and intended scope of the invention.

We claim:

1. A noise-transmission-reducing covering for the inside of the passenger compartments of vehicles, the inside having a sound field, said covering comprising:

a carpet covering top layer made of an air-permeable material for facing the passenger compartment, an acoustic insulation composite including:

an air-permeable dense layer underlying the carpet covering top layer and adjacent to said carpet covering top layer, said dense layer including openings therein and functioning as a solid mass, a spongy mass layer underlying said dense layer, said spongy mass layer functioning as a spring, said spongy mass having a sound-damping quality of the acoustic insulation composite;

a steam permeable, water impermeable and sound wave transmissible insulating barrier layer interposed between said dense layer and said spongy mass layer;

wherein said air-permeable carpet top covering layer and said air-permeable dense layer couple the sound field acoustically with said spongy mass layer, thereby increasing sound-absorbing effectiveness of said covering.

2. A noise-transmission-reducing covering for the inside of the passenger compartments of vehicles, the inside having a sound field, said covering consisting of:

a carpet covering top layer made of an air-permeable material for facing the passenger compartment, an acoustic insulation composite including:

an air-permeable dense layer underlying the carpet covering top layer and adjacent to said carpet covering top layer, said layer integrated into the carpet covering and including openings partially filled with a foamed material, said layer functioning as a solid mass, a spongy mass layer underlying said dense layer, said spongy mass layer functioning as a spring, said spongy mass having a sound-damping quality of the acoustic insulation composite;

a steam permeable, water impermeable and sound wave transmissible insulating barrier layer interposed between said dense layer and said spongy mass layer; and wherein said air-permeable carpet top covering layer and said air-permeable dense layer couple the sound field acoustically with said spongy mass layer, thereby increasing sound-absorbing effectiveness of said covering.

* * * * *